United States Patent Office 3,531,568
Patented Sept. 29, 1970

3,531,568
MEDICATED POULTRY DRINKING COMPOSITION COMPRISING A TETRACYCLINE ANTIBIOTIC AND A SULFATE COMPOUND AND THE USE THEREOF
Joseph Michael Pensack, Trenton, N.J., assignor to American Cyanamid Company, Stamford, Conn., a corporation of Maine
No Drawing. Continuation-in-part of applications Ser. No. 313,171, Oct. 2, 1963, and Ser. No. 515,759, Dec. 22, 1965. This application June 28, 1966, Ser. No. 561,053
Int. Cl. A61k 21/00
U.S. Cl. 424—164    4 Claims

ABSTRACT OF THE DISCLOSURE

Compositions comprising water, a tetracycline antibiotic and a sulfate ion used for controlling infectious diseases in poultry.

This application is a continuation-in-part of my presently copending applications Ser. Nos. 313,171, filed Oct. 2, 1963 and 515,759, filed Dec. 22, 1965, the latter being a continuation-in-part of an application Ser. No. 313,177, filed Oct. 2, 1963, both of which are now abandoned. The invention common to both of these parent applications is the discovery that certain important advantages are obtainable by the oral administration to poultry of small but definite quantities of potentiating sulfate ion, provided by a salt which has a cation carrying a single positive charge, in conjunction with the administration of certain medication thereto, as will hereinafter be more fully described. Stated briefly, these advantages are (1) blood level improvements when the sulfate is incorporated into a balanced diet containing a tetracycline antibiotic, and (2) increased ingestion by the poultry of drinking water containing the sulfate ion together with certain hereinafter-described medicaments.

POTENTIATED POULTRY FEED COMPOSITION

This part of my invention relates to novel poultry feed compositions containing a tetracycline antibiotic and a potentiating agent therefor which are highly useful in controlling infectious diseases and in accelerating the growth of poultry. More particularly, the present invention concerns a poultry feed containing the normally added, inorganic calcium and phosphate supplements, a tetracycline antibiotic, and an adjuvant which promotes increased absorption of the antibiotic by the blood and tissue of poultry consuming the treated feed.

Although the broad-spectrum antibiotics chlortetracycline, tetracycline, oxytetracycline, and demethylchlortetracycline have been found to be extremely effective for controlling infectious diseases and for stimulating growth in poultry; nevertheless, due to incomplete absorption thereof by the poultry, believed to be due at least in part to the presence of calcium and other metallic cations in the diet, full utilization of such antibiotics has never been achieved.

It is known that the standard sources for calcium and phosphorus in animal diets, particularly poultry diets, are generally calcium carbonate, calcium hydrogen phosphate and bone meal. These materials, while generally considered necessary for normal poultry growth, have been found to markedly lower the blood levels of the tetracycline antibiotics. Since improvement in health is normally related to blood levels of antibiotic, efforts have been made to overcome the deleterious effects of calcium on the blood levels of the antibiotic without eliminating calcium from the diet.

It is generally believed that the calcium ion forms a complex with the tetracycline antibiotics which prevents absorption thereof by the blood. Since such antibiotics are rather expensive, it is most desirable to provide a means by which maximum absorption of the antibiotic is achieved. Various means, such as a low calcium diet, have been proposed to accomplish this end but no entirely satisfactory method of solving this problem is presently available. While the low-calcium diet may be used for short periods of time, as for example, when treating diseased poultry with therapeutic quantities of antibiotic, continued feeding of the low calcium diet for extended periods of time can result in malformed bone structure and improper poultry growth.

In poultry of large size, such as turkeys, the problem is even more acute than it is with smaller fowl, such as chickens, since the larger birds require substantially more phosphorus and calcium for normal growth than do the smaller ones. According to the National Research Council, turkeys require at least about 1.0% phosphorus and 2.0% calcium, whereas chickens require about 0.6% phosphorus and only 1.0% calcium for normal growth. While somewhat lower levels of calcium and phosphorus have been used effectively by poultry growers, the levels cannot be reduced below about 70% of the given values without seriously affecting the growth of the poultry. If these requirements are not met, the larger birds, i.e., turkeys especially, are plagued with serious leg defects which ultimately lead to their loss as marketable birds.

While the calcium requirement for poultry feed could be satisfied by the addition thereto of a selected calcium salt which is free of phosphorus, e.g., calcium sulfate, and which from the standpoint of complexing with the tetracycline antibiotic is less objectionable than other calcium salts, as for example, calcium carbonate, such addition will in no way satisfy the phosphorus requirement. Phosphorus is essential for normal growth and bone development and it must be supplied in some form. Conventionally, feed supplements such as fish meal, bone meal, meat scraps and dicalcium phosphate have been added to feeds to provide the required phosphorus. These materials are relatively inexpensive and, in addition furnish other necessary constituents such as minerals, protein and/or vitamins. However, they contain substantial proportions of calcium in a form which readily complexes with the tetracycline antibiotics, i.e., tricalcium phosphate or dicalcium phosphate.

Due to the high cost of antibiotics it is desirable to obtain maximum efficacy for a given amount of antibiotic. Therefore, losses of antibiotic by any means must be prevented if the use thereof is to be practical. To accomplish this end it has been proposed that calcium-free phosphates might be added to the feed. However, it has been found that feeds prepared with such additives are not entirely satisfactory since they are generally too alkaline or acidic, depending upon the additive used, and are not palatable to poultry when the phosphorus requirement is satisfied by the sole addition of such non-conventional phosphates. Some non-conventional phosphates react with the feed, rendering it useless; others are too costly to be practical and do not furnish essential minerals, proteins or vitamins required for normal growth.

It would be most desirable commercially to obtain compositions which would permit the effectiveness of the tetracycline antibiotics to be appreciably enhanced. It has been found that this most desirable object can be achieved with the novel compositions of the present invention which comprise a tetracycline antibiotic, that is, any antimicrobially active form of the antibiotics tetracycline, chlortetracycline, oxytetracycline, demethylchlortetracycline and structurally related substances and a novel potentiating agent as described more fully hereinafter.

Thus the invention provides a method of treating poultry feeds containing a tetracycline antibiotic and the recommended amounts of calcium and phosphorus supplied from conventional sources whereby the absorption of the antibiotic by the blood and tissue of the poultry consuming the same is significantly increased. Preferably the calcium requirements are supplied by tricalcium phosphate, dicalcium phosphate or a mixture of both. It has been found that such compositions produce substantially higher antibiotic blood levels in poultry from a given amount of antibiotic than has heretofore been possible with feeds containing like concentrations of the above-mentioned ingredients.

Briefly, the instant invention comprises a poultry feed which is nutritionally adequate per se and containing phosphorus, calcium and a tetracycline antibiotic and between about 0.24% and 2.4% sulfate ion provided by a sulfate salt which has a cation carrying a single positive charge. The sulfate salts are selected from the group consisting of sodium sulfate, sodium bisulfate, potassium sulfate, potassium bisulfate, ammonium sulfate, ammonium bisulfate, sulfuric acid and mixtures thereof and preferably are used in an amount sufficient to provide about 0.96% of sulfate ion based on the weight of the finished feed. Organic sulfates of a cation carrying a single positive charge, such as trimethyl ammonium sulfate, dimethyl ammonium sulfate and the like, may also be employed but with less advantage.

As previously stated, it has been found that the total concentration of sulfate ion should amount to not less than about 0.24% nor more than about 24% of the finished feed. This is equivalent to from 4.8 to 48 pounds of sulfate ion per ton of feed or, for example, from about 7 to 70 pounds of sodium sulfate per ton of feed. For convenience, simplification and a better understanding of the invention, a table is provided below which permits rapid conversion of the percent sulfate ion, within the limits of the invention, to percent sulfate salt in the feed, pounds of sulfate ion per ton of feed and pounds of sulfate salt per ton of feed, for a number of the salts contemplated for use in preparation of the animal feeds of the invention.

CONVERSION TABLE

| Sulfate Salt With Cation Carrying Single Positive Charge | Percent Sulfate ion in feed | Percent sulfate salt in feed | Sulfate ion in lbs./ton feed | Sulfate salt in lbs./ton feed |
|---|---|---|---|---|
| $Na_2SO_4$ | 0.24–2.4 | 0.35–2.5 | 4.8–48.0 | 7.1–71.0 |
| $NaHSO_4$ | 0.24–2.4 | 0.30–3.0 | 4.8–48.0 | 6.0–60.0 |
| $NaHSO_4 \cdot H_2O$ | 0.24–2.4 | 0.345–3.45 | 4.8–48.0 | 6.9–69.0 |
| $Na_2SO_4 \cdot 7H_2O$ | 0.24–2.4 | 0.67–6.7 | 4.8–48.0 | 13.4–134.0 |
| $K_2SO_4$ | 0.24–2.4 | 0.43–4.3 | 4.8–48.0 | 8.7–87.0 |
| $KHSO_4$ | 0.24–2.4 | 0.34–3.4 | 4.8–48.0 | 6.8–68.0 |
| $(NH_4)_2SO_4$ | 0.24–2.4 | 0.33–3.3 | 4.8–48.0 | 6.6–66.0 |
| $NH_4HSO_4$ | 0.24–2.4 | 0.29–2.9 | 4.8–48.0 | 5.7–57.0 |
| $H_2SO_4$ | 0.24–2.4 | 0.25–2.5 | 4.8–48.0 | 4.9–49.0 |

While sulfates of cations carrying a single positive charge have been found to be effective potentiators for tetracycline antibiotics orally administered, sulfates and bisulfates of cations carrying more than one positive charge generally have been found to produce substantially less desirable results. Some multivalent metallic sulfates actually inhibit absorption of tetracycline antibiotics while others require reduction in the amount of conventional calcium and phosphorus additives in the diet to be effective.

At sulfate ion levels below about 0.24% in the diet, little, if any, potentiation of the tetracycline antibiotic is obtained and at levels exceeding about 2.4% it has been found that wet litter is sometimes produced. Since wet litter is a breeding ground for infectious diseases, such conditions are obviously undesirable.

Surprisingly, in accordance with the present invention, it has been discovered that the addition of sulfate ion in the amounts stated to a finished poultry feed containing a tetracycline antibiotic will produce a significant increase in antibiotic blood levels for a given concentration of antibiotic in the feed without causing undesirable effects.

Also, the addition of sodium sulfate, in particular, to poultry feed pre-mixes or concentrates, used for the preparation of potentiated antibiotic feeds, has the surprising advantage that it noticeably reduces dusting and improves flowability of the pre-mix materials. In a concentrate comprising a conventional feedstuff, dried chlortetracycline fermentation harvest mash solids, an edible oil and a major portion of anhydrous sodium sulfate, no dusting or separation of fines could be observed. In contrast thereto, a similar pre-mix minus the sodium sulfate additive showed noticeable separation or stratification of fines in the lower portions of the mix and considerable dusting.

Pre-mixes or concentrates included within the scope of the instant invention and useful in supplementing one ton of feed may contain from about 4.8 to 48 pounds of sulfate ion provided by a sulfate salt which has a cation carrying a single positive charge such as sodium sulfate, potassium sulfate, sodium bisulfate, potassium bisulfate, sulfuric acid, ammonium sulfate, ammonium acid sulfate or mixtures thereof; from 10 to 1000 parts per million of a tetracycline antibiotic, such as tetracycline, oxytetracycline, chlorotetracycline, demethylchlortetracycline and the like; mixtures of tetracycline antibiotics; and an edible feedstuff. Other edible diluents may be added if desired.

Pre-mixes which are particularly desirable for supplementing one tone of poultry feed contain, in addition to feedstuff or other inert edible carrier, from about 100 to 500 grams of tetracycline antibiotic and 14 to 28 pounds of sulfate ion provided by a sulfate salt which has a cation carrying a single positive charge.

Any of the commercially available and commonly used tetracycline antibiotics such as tetracycline, chlortetracycline, oxytetracycline, demethylchlortetracycline and the like may be used. Chlortetracycline, however, is preferred because of its already wide acceptance as an animal feed additive of choice and because it is more effective than the other tetracycline antibiotics.

Preferably, the tetracycline antibiotic is present to the extent of between about 50 and 500 parts per million based on the weight of the feed with the optimum amount being about 200-400 parts per million.

MEDICATED COMPOSITION AND METHOD FOR POULTRY DRINKING WATER

It has been standard practice for a number of years in the poultry industry to administer medicaments such as the broad-spectrum antibiotics chlortetracycline, tetracycline, oxytetracycline, demethylchlortetracycline and the like to poultry in their drinking water in order to control infectious diseases particularly those of sub-clinical nature and for the purpose of stimulating the growth of poultry. The prophylactic and therapeutic use of such antibiotics has met with wide commercial acceptance.

Chronic respiratory disease is a respiratory infection of chickens and turkeys characterized by respiratory rales, coughing, and nasal discharge. The clinical manifestations are slow to develop and the disease has a long course. Chronic respiratory disease has become an important flock problem in all areas of the United States, and losses from this disease may be very costly to the producer. It is also present in Canada, Australia, Holland, South Africa and Brazil. *Mycoplasma gallisepticum* is the pathogenic avian pleuropneumonia-like organism (PPLO) causing chronic respiratory disease.

Chlortetracycline, among other drugs, has been used to combat this infection. Another drug that has been found to be effective is the antibiotic known as tylosin. This antibiotic is described in British Pat. No. 901,273.

Several methods of administration of these drugs may be used effectively, but the method found most practical for use in the field is administration in the drinking water at recommended levels of about two grams per gallon. While such drug levels are generally palatable to poultry and will usually control PPLO in a diseased flock, if the flock should be come infected with PPLO and Coliform simultaneously, high levels of medication are required and such medication must be provided in the matter of a few days or it can be expected that from 20% to 30% of the flock will be lost either by death or condemnation at slaughter. It is, therefore, necessary, when disease symptoms are recognized, to assure that high levels of medication are ingested by the entire flock as rapidly as possible. In the past this has been a very real problem, for sick birds lose their appetite for food and drink. Thus at the critical stage, the birds consume less, rather than more, medicament.

Another disease which plagues the poultry industry and which can claim from 50% to 100% of a flock in a matter of several days after infectious symptoms are noted is Blackhead disease, more accurately known as infectious enterohepatitis or histomoniasis. The disease is caused by a microscopic, single-cell, protozoan parasite, *Histomonas meleagrides*. The histomonads multiply rapidly in the cecum and cause severe damage such as enlargement of the cecum, ulceration, hemorrhage and thickening with hardening of the cecal walls. 2-amino-5-nitrothiazole and 2-acetylamino-5-nitrothiazole have been found to be effective against the disease when used alone or in combination with the tetracycline antibiotics. However, as stated above, diseased birds tend to lose their appetite for food and drink at the time when medication is most essential. Therefore, when administering these drugs in the drink and feed, which is the only really practical method of administration for a large flock, it can be seen that the amount of medication ingested by the birds is reduced at the critical stage.

This part of my invention attempts to overcome these problems by the addition to a medicated drinking water composition of a sulfate of a cation carrying a single positive charge. Preferably, these are selected from the group consisting of the monovalent metallic sulfates, sodium sulfate, sodium bisulfate, potassium sulfate and potassium bisulfate; sulfuric acid; ammonium sulfate, ammonium acid sulfate, and mixtures thereof. The sulfate ion has been found to bring about an increased consumption of water and thus an increased consumption of medicament. Also contemplated by the invention are the organic sulfates such as trimethyl ammonium sulfate, dimethyl ammonium sulfate and the like. Secondarily, when the medicament is a tetracycline antibiotic the use of the described sulfate ion actually promotes increased absorption of the antibiotic and thus acts as a potentiating agent or adjuvant and thereby produces higher blood levels of the antibiotic than are obtainable from the use of the antibiotic alone.

In carrying out my invention, in its simplest aspect, it is necessary only to add to a medicated poultry drinking water a sufficient quantity of a sulfate of a cation carrying a single positive charge to provide from about 0.1 to about 1.0 percent by weight of a sulfate ion in the medicated water. In a more preferred embodiment, however, and to conform to usage in the poultry industry it is preferred to add the described sulfate directly to the powdered medicament which is generally packaged in concentrated form for addition to a given quantity of water to produce the desired concentration of drug. Under such circumstances, it is preferred to add from about 0.5 to about 50 grams of sulfate ion per gram of medicament.

In its broadest aspects, my invention does not depend on the use of any particular medicament as it has been found that the use of the sulfate of a cation carrying a single positive charge increases the consumption of water independent of the medicament used. As indicated hereinbefore, however, a further advantage of the present invention is achieved when the tetracycline antibiotics are employed because not only are they effective in controlling these diseases as well as in enhancing the growth of poultry but when used with the addition of the described sulfate increased absorption of the antibiotic is achieved and higher blood levels are obtained more rapidly. The invention will be described in greater detail in conjunction with the following specific examples.

EXAMPLE I

Turkeys, 31 days old and of substantially equal size and weight, were randomly divided into 19 groups of ten turkeys each. These birds were placed in cages and fasted overnight. The following morning a diet of ground yellow corn supplemented with either 200 or 400 p.p.m. of chlortetracycline and selected amounts of calcium, phosphorus and the potentiating agent sodium sulfate, as described in Table I below, was fed to the turkeys ad libitum for three hours. Immediately following the three hour feeding period, the turkeys were bled by cardiac puncture. 1½ ml. of blood was taken from each bird and assayed microbiologically. An average of the results obtained with each group of turkeys is reported in Table I below.

TABLE I.—CHLORTETRACYCLINE BLOOD LEVELS OBTAINED FROM ADDITIONS TO GROUND YELLOW CORN FED TO TURKEYS

| | Supplement | | | Avg. blood levels with — | |
|---|---|---|---|---|---|
| Percent $Ca^{++}$ | Percent inorganic phosphorus | Source $Ca^{++}$ plus phosphorus | percent $Na_2SO_4$ | 200 p.p.m. CTC in feed | 400 p.p.m. CTC in feed |
| 0.01 | 0.00 | None | 0.0 | 0.42 | 0.81 |
| 0.01 | 0.00 | do | 4.93 | 0.51 | 0.99 |
| 1.44 | 0.75 | Dicalcium phosphate | 0.0 | 0.05 | 0.11 |
| 1.44 | 0.75 | do | 4.93 | 0.22 | 0.52 |
| 1.44 | 0.75 | $CaCO_3+H_3PO_4$ | 0.0 | 0.05 | 0.13 |
| 1.44 | 0.75 | $CaCO_3+H_3PO_4$ | 4.93 | 0.27 | 0.43 |
| 1.44 | 0.75 | $CaCO_3+NaH_2PO_4 \cdot H_2O$ | 0.0 | 0.04 | 0.14 |
| 1.44 | 0.75 | $CaCO_3+NaH_2PO_4 \cdot H_2O$ | 4.93 | 0.25 | 0.61 |

From the data provided in Table I above, it can be readily seen that: (1) the addition of calcium and phosphorus to a poultry diet containing a given amount of chlortetracycline causes severe depression of blood levels in poultry consuming the same. (2) The addiiton of sodium sulfate to a poultry diet containing given amounts of chlortetracycline, calcium and phosphorus csauses a significant increase in the antibiotic blood levels of poultry consuming such diet. That is, the addition of sodium sulfate to the above diets produces as much as a six-fold increase in the antibiotic blood levels for a given amount of antibiotic in the diet.

EXAMPLE II

Following the procedure set forth in Example I, 31-day old turkeys were divided into 19 groups of ten each, placed in cages and fasted overnight. The following morning they were fed ad libitum a ground corn diet containing 1.4% calcium ion and 0.75% inorganic phosphorus supplied by 5% fish meal and 3.3% dicalcium phosphate and supplemented with 400 p.p.m. of chlortetracycline hydrochloride.

In addition, the diets of ten groups of turkeys were potentiated with various amounts of sodium sulfate. After three hours feeding, the birds were bled by cardiac puncture and the chlortetracycline blood levels obtained by microbiological assay. The results obtained are shown below.

TABLE II

| Supplements, percent | | | Blood CTC, mcg. per ml. |
|---|---|---|---|
| Fish meal | Dicalcium phosphate | Na$_2$SO$_4$ | |
| 5.0 | 3.30 | | 0.268 |
| 5.0 | 3.30 | 0.355 | 0.230 |
| 5.0 | 3.30 | 0.71 | 0.334 |
| 5.0 | 3.30 | 1.065 | 0.439 |
| 5.0 | 3.30 | 1.42 | 0.425 |
| 5.0 | 3.30 | 1.775 | 0.608 |
| 5.0 | 3.30 | 2.13 | 0.648 |
| 5.0 | 3.30 | 2.485 | 0.684 |
| 5.0 | 3.30 | 2.84 | 0.804 |
| 5.0 | 3.30 | 3.195 | 0.828 |

The additional nine groups of birds were treated in the same manner as those described above but the diet was altered to determine the effect substitution of calcium sulfate and sodium acid phosphate for equivalent amounts of dicalcium phosphate in the diet would have on the blood levels of the antibiotic. In this series the calcium ion concentration and inorganic phosphorus level were maintained at 1.4% and .75%, respectively. However, dicalcium phosphate was removed in increments from the diet and equivalent quantities of calcium sulfate and sodium acid phosphate were substituted therefor. After feeding for three hours, the birds were bled by cardiac puncture and the chlortetracycline blood level assays microbiologically. The results obtained are given below.

TABLE III

| Supplements, Percent | | | | | Blood CTC, mcg. per ml. |
|---|---|---|---|---|---|
| Fish meal | Dicalcium phosphate | Na$_2$SO$_4$ | CaSO$_4$.2H$_2$O | NaH$_2$PO$_4$.H$_2$O | |
| 5.0 | 3.04 | | 0.43 | 0.232 | 0.266 |
| 5.0 | 2.75 | | 0.86 | 0.464 | 0.306 |
| 5.0 | 2.46 | | 1.29 | 0.696 | 0.349 |
| 5.0 | 2.17 | | 1.72 | 0.928 | 0.437 |
| 5.0 | 1.88 | | 2.15 | 1.160 | 0.340 |
| 5.0 | 1.59 | | 2.58 | 1.392 | 0.388 |
| 5.0 | 1.30 | | 3.01 | 1.624 | 0.630 |
| 5.0 | 1.01 | | 3.44 | 1.856 | 0.496 |
| 5.0 | 0.72 | | 3.87 | 2.088 | 0.638 |

On examination of these data it can be seen that (1) the addition of from 0.355% to about 3.2% of sodium sulfate by weight of diet, significantly increased the blood levels of chlortetracycline obtainable from diets containing such antibiotic and recommend levels of calcium and phosphorus supplied from conventional sources. (2) The use of sodium sulfate as a potentiator for chlortetracycline produced substantially higher blood levels for a given amount of chlortetracycline than can be obtained by substitution of calcium and phosphorus in less objectionable forms than the forms present in conventional additives.

EXAMPLE III

Twenty-eight day-old chicks were randomly divided into 10 groups of 10 chicks each. These chicks were fasted overnight and the following morning fed ad libitum a diet of ground corn supplemented with 0.8% calcium and 200 p.p.m. of chlortetracycline. In some tests sodium sulfate was also added to the diet and in others calcium sulfate was substituted for an equivalent amount of calcium carbonate. Three hours after feeding was begun all birds were bled by cardiac puncture. One and one-half milliliters of blood were taken and blood levels of chlortetracycline were determined by microbiological assay.

In the series of tests in which sodium sulfate was added to the diet the calcium content was maintained at 0.8% with calcium carbonate. Sodium sulfate was added to the diet at increments of 0.355%. The results obtained are shown below.

TABLE IV

| Supplements, Percent | | | Blood CTC, mcg. per ml. |
|---|---|---|---|
| CaCO$_3$ | CaSO$_4$.2H$_2$O | Na$_2$SO$_4$ | |
| 2.00 | | | 0.154 |
| 2.00 | | 0.355 | 0.186 |
| 2.00 | | 0.71 | 0.213 |
| 2.00 | | 1.065 | 0.224 |
| 2.00 | | 1.42 | 0.256 |
| 1.75 | 0.43 | | 0.159 |
| 1.50 | 0.86 | | 0.175 |
| 1.25 | 1.29 | | 0.195 |
| 1.00 | 1.72 | | 0.234 |

The calcium ion concentration in the feed containing 200 p.p.m. chlortetracycline was maintained at 0.8%. However, in these tests initially 0.8% or all of the calcium in the diet was provided as CaCO$_3$ and then increments of CaSO$_4$ equivalent to 0.1% Ca$^{++}$ were substituted for the CaCO$_3$ in the diet.

The results of these tests show that the addition of from 0.355% to 1.42% of calcium sulfate to a chick diet produced a significant potentiation of chlortetracycline blood levels. Substitution of calcium sulfate for dicalcium phosphate produced much less desirable results.

EXAMPLE IV

In these tests six groups of day-old turkey poults, ten turkeys per group, were weighed and placed in cages where they were permitted to feed and drink ad libitum for 21 days. The diet supplied was a standard-laboratory turkey diet supplemented with from 0 to 3.2% by weight of sodium sulfate. The feed provided for each group was weighed and total feed consumption was calculated for the 21-day test period.

At the end of the test period the groups of birds were weighed and their average weight and the average grams of feed per gram gain was determined. The results of the tests were recorded and appear in Table V below. The diet employed is also provided below.

TABLE V—WEIGHT GAIN AND SAFETY FACTOR FOR Na₂SO₄ SUPPLEMENTED DIET

| Sodium sulfate in diet, percent | Avg. wt. 21 days (grams) | Gms. feed per gm. gain |
|---|---|---|
| None | 408 | 1.57 |
| 0.2 | 390 | 1.57 |
| 0.4 | 403 | 1.54 |
| 0.8 | 407 | 1.57 |
| 1.6 | 423 | 1.53 |
| 3.2 | 404 | 1.61 |

| Diet: | Percent |
|---|---|
| Ground yellow corn | 40.7 |
| Soybean oil meal | 45.5 |
| Menhaden fish meal | 7.5 |
| $CaCO_3$ | 2.4 |
| Dicalcium phosphate | 2.0 |
| Brewers dried yeast | 1.25 |
| Iodized salt | 0.250 |
| Magnesium sulfate | 0.025 |
| Vitamin A (10,000 IU/gm.) | 0.110 |
| Vitamin D-3 (15,000 ICU/gm.) | 0.009 |
| Choline chloride—25% | 0.125 |
| Vitamin supplement 92 [1] | 0.100 |
| Vitamin $B_{12}$ | 0.025 |
| Niacin | 0.0044 |
| D-alpha tocopherol acetate | 0.00055 |
| Folic acid feed supplement | 0.0030 |

[1] See table below:

| | Mg./lb. |
|---|---|
| Riboflavin | 2,000 |
| Calcium pantothenate | 4,000 |
| Niacin | 9,000 |
| Choline chloride | 10,000 | and parts of wheat middlings, sodium carbonate, and soybean oil.

From these data, it can be seen that all birds consuming a sodium sulfate supplemented diet gained normally and showed good feed to weight conversion.

EXAMPLE V

Following the procedure set forth in Example IV, day-old chicks were divided into groups of ten. The groups of chicks were weighed, placed in standard poultry cages where they were permitted to feed and drink ad libitum for 28 days. The diet employed was a standard commercial chick diet, as described below, supplemented with various concentrations of sodium sulfate. The feed provided each group of chicks was carefully weighed and the total weight employed for the 28-day test period determined. On termination of the tests, the groups of chicks were weighed and the average weight per bird, per group calculated. The average grams of feed per gram gain for each chick group was also calculated and the results are recorded in Table VI below. The diet used is likewise set forth below.

TABLE VI.—WEIGHT GAIN AND SAFETY FACTOR FOR SODIUM SULFATE SUPPLEMENTED DIET

| Supplement | Gms. feed per gm. gain | Avg. wt. after 28 days (gram) |
|---|---|---|
| None | 1.693 | 536 |
| 0.2% Na₂SO₄ | 1.698 | 527 |
| 0.4% Na₂SO₄ | 1.680 | 535 |
| 0.8% Na₂SO₄ | 1.644 | 542 |
| 1.6% Na₂SO₄ | 1.692 | 536 |
| 3.2% Na₂SO₄ | 1.703 | 553 |

| Diet: | Gm./kg. |
|---|---|
| Ground yellow corn | 514 |
| Soybean oil meal (44%) | 300 |
| Menhaden fish meal (60%) | 50 |
| Corn gluten meal (41%) | 50 |
| Dehydrated alfalfa meal (17%) | 20 |
| Stabilized fat | 40 |
| Ground limestone | 5 |
| Dicalcium phosphate | 12 |
| Sodium chloride | 3 |
| Delamix+2% zinc [1] | 1 |
| Vitamin pre-mix [2] | 5 |

[1] See Table below:

| | Percent |
|---|---|
| Manganese | 6.0 |
| Iodine | .12 |
| Iron | 2.0 |
| Copper | .2 |
| Zinc | 2.0 |
| Cobalt | .02 |
| Calcium | 25.5 |

[2] See table below:

| | Amount per kg. feed |
|---|---|
| Butylated hydroxy toluene mg | 125 |
| DL-methionine mg | 500 |
| Vitamin A IU | 3,300 |
| Vitamin $D_3$ ICU | 1,100 |
| Vitamin E IU | 2.2 |
| Vitamin $B_{12}$ mcg | 11 |
| Riboflavin mg | 4.4 |
| Niacin mg | 27.5 |
| Pantothenic acid mg | 8.8 |
| Choline chloride mg | 500 |
| Folic acid mg | 1.43 |
| Menadione sodium bisulfite to 5 g. of ground yellow corn mg | 1.1 |

From the data in Table VI, it can be seen that chicks fed a normal diet supplemented with sodium sulfate gained normally and were found to have a good feed to weight gain conversion rate.

EXAMPLE VI

Following the procedure set forth in Example III, twenty-seven day old chicks were divided into groups of twelve chicks each. These groups were fasted overnight. The following morning they were fed ad libitum a ground corn diet containing 200 p.p.m. CTC.HCl and 0.8% calcium ion as calcium carbonate. Additionally, diets other than the control were supplemented with 1.03% dietary sulfate ion furnished by various sulfate or bisulfate salts. Three hours after feeding was commenced the chicks were bled by cardiac puncture and the blood was assayed microbiologically for CTC. The results obtained are shown in Table VII below where it can be readily seen that the CTC blood levels in chicks consuming diets containing sulfates and bisulfates of cations carrying a single positive charge were significantly enhanced, whereas the CTC blood levels in those consuming diets containing sulfates of cations carrying two positive charges were no better than the unpotentiated control.

TABLE VII

Chlortetracycline blood levels obtained from additions to ground yellow corn fed to chicks

| Supplement: | 3 hours after feeding blood CTC, γ/ml. |
|---|---|
| None | 0.11 |
| $H_2SO_4$ | 0.26 |
| $Na_2SO_4$ | 0.17 |
| $K_2SO_4$ | 0.24 |
| $NaHSO_4 \cdot H_2O$ | 0.24 |
| $KHSO_4$ | 0.20 |
| $(NH_4)_2SO_4$ | 0.21 |
| $MgSO_4$ | 0.11 |
| $MnSO_4 \cdot H_2O$ | 0.08 |

EXAMPLE VII

In the following tests 24 groups of 5 day-old chicks, 24 groups of 12 day-old chicks and 36 groups of 19 day-old chicks were selected from three flocks. Birds in each particular flock were of substantially the same weight and size and 12 birds were selected at random for each group.

Four combinations of prepared feed and drink were selected for testing in the 5 and 12 day-old chicks and two additional combinations were used in the tests with the 19 day-old chicks. The feed and drink combinations used in these tests were as follows:

FEED AND DRINK COMBINATIONS

| Feed | Water |
|---|---|
| Diet: | |
| I____ Feed plus 200 p.p.m. CTC___ | H₂O. |
| II_____do_____ | H₂O plus 0.71% Na₂SO₄. |
| III___ Feed_____ | H₂O plus 500 p.p.m. CTC. |
| IV_____do_____ | H₂O plus 500 p.p.m. CTC plus 0.71% Na₂SO₄. |
| V____ Feed plus 200 p.p.m. CTC__ | H₂O plus 500 p.p.m. CTC. |
| VI_____do_____ | H₂O plus 500 p.p.m. CTC plus 0.71% Na₂SO₄. |

The diet used in all tests was ground yellow corn containing 1% calcium carbonate and supplemented with chlortetracycline (CTC) as indicated in the feed and drink combination table.

After selected of the chicks for the various groups to be tested, each group was separately caged. All groups were fasted overnight and the following morning all of the various groups were permitted to feed and drink ad libitum the diet selected. Each of the above-noted diets, III through VI, were given to six separate groups of chicks from the 19 day-old flock.

Two hours after feeding was begun fourteen groups of chicks, one group from each dietary group in each of the 5, 12 and 19 day-old flocks, were selected. All birds in each group were bled by cardiac puncture and 1½ ml. of blood taken and assayed microbiologically for chlortetracycline blood levels. At 4, 6, 8, 16 and 24 hour periods after feeding was begun, additional groups (one from each dietary group in each of the 5, 12 and 19 day-old flocks) were bled and blood serum levels of CTC ascertained microbiologically. The results obtained appear in the table below.

TABLE VIII

| | Age of chicks in days | Blood CTC at— | | | | |
|---|---|---|---|---|---|---|
| | | 4 hrs. | 6 hrs. | 8 hrs. | 16 hrs. | 24 hrs. |
| Diet: | | | | | | |
| I_____ | 19 | 0.14 | 0.18 | 0.16 | 0.17 | 0.13 |
| II_____ | 19 | 0.18 | 0.20 | 0.19 | 0.31 | 0.22 |
| III_____ | 5 | 1.53 | 2.25 | 1.78 | 1.98 | 1.03 |
| | 12 | 0.77 | 1.07 | 1.17 | 0.90 | 0.82 |
| | 19 | 0.28 | 0.34 | 0.46 | 0.30 | 0.27 |
| IV_____ | 5 | 5.45 | 3.19 | 4.05 | 2.78 | 3.63 |
| | 12 | 1.22 | 1.45 | 1.32 | 1.31 | 0.66 |
| | 19 | 0.33 | 0.55 | 0.99 | 0.68 | 0.39 |
| V_____ | 5 | 2.18 | 2.13 | 3.11 | 1.57 | 1.44 |
| | 19 | 0.27 | 0.48 | 0.34 | 0.33 | 0.28 |
| | 12 | 1.19 | 1.79 | 1.14 | 0.89 | 0.80 |
| VI_____ | 5 | 4.38 | 5.15 | 3.43 | 3.61 | 3.13 |
| | 19 | 0.35 | 0.33 | 0.50 | 0.69 | 0.55 |
| | 12 | 1.68 | 1.91 | 1.91 | 1.42 | 1.30 |

From this data it can be seen that (1) the CTC blood levels, from a given amount of CTC orally administered, are significantly increased in poultry of all ages when sodium sulfate is added to the poultry drinking water; (2) the blood levels obtainable from a given amount of CTC potentiated with a given amount of sodium sulfate are significantly higher in young chicks than in older birds. It is an advantage that CTC blood levels in young chicks are very high for while young chicks are susceptible to disease infection, rapid and effective treatment against disease is possible. High CTC blood levels in young chicks is also advantageous since rapid growth rate and control of diseases reduces the cost of raising poultry.

(3) These data demonstrate the potentiating effect of sodium sulfate on CTC blood levels when CTC is administered to poultry in the drinking water along with the sodium sulfate.

(4) These data also show the potentiating effect on CTC blood levels when sodium sulfate is administered in the drinking water and CTC is provided in both the drinking water and feed.

(5) Finally, the data show that addition of sodium sulfate to drinking water of poultry consuming a feed supplemented with CTC will produce an increase in CTC blood levels in the poultry.

EXAMPLE VIII

Twenty-six day-old chicks of substantially similar size and weight were randomly divided into thirty-six groups of twelve chicks each. The groups were separately caged and starved overnight. The following morning the tests were begun with all groups being permitted to eat and drink ad libitum the prepared diets and drink provided. The basal ration used for all groups comprised a ground yellow corn containing 1% calcium carbonate and specified quantities of chlortetracycline (CTC). Water to which specified amounts of sodium sulfate and chlortetracycline has been added was supplied to the chicks for drinking purposes.

Six combinations of prepared feed and drink were selected for the tests and the combinations used were as follows:

FEED AND DRINK COMBINATIONS

| Feed | Water |
|---|---|
| Diet: | |
| I____ Feed plus 200 p.p.m. CTC__ | H₂O. |
| II_____do_____ | H₂O plus 0.71% Na₂SO₄. |
| III___ Feed_____ | H₂O plus 500 p.p.m. CTC. |
| IV_____do_____ | H₂O plus 500 p.p.m. CTC plus 0.71% Na₂SO₄. |
| V____ Feed plus 200 p.p.m. CTC__ | H₂O plus 500 p.p.m. CTC. |
| VI_____do_____ | H₂O plus 500 p.p.m. CTC plus 0.71% Na₂SO₄. |

Each of the above-noted diets was given to six randomly selected groups of chicks. Two hours after feeding had begun one group of chicks from each dietary group was selected. All birds in each group were bled by cardiac puncture and 1½ ml. of blood taken and assayed microbiologically for CTC blood levels. At 4, 6, 8, 16 and 24 hour periods after feed was begun, additional groups (one from each dietary group) were bled and blood serum levels of CTC ascertained microbiologically. Results of these tests are provided below.

TABLE IX.—26 DAY-OLD CHICKS

| Hours | Blood CTC at— | | | | |
|---|---|---|---|---|---|
| | 4 | 6 | 8 | 16 | 24 |
| Diet: | | | | | |
| I_____ | .12 | .13 | .10 | .11 | .07 |
| II____ | .09 | .14 | .17 | .18 | .16 |
| III___ | .28 | .17 | .15 | .40 | .18 |
| IV____ | .28 | .19 | .30 | .17 | .29 |
| V_____ | .15 | .30 | .23 | .32 | .28 |
| VI____ | .31 | .34 | .42 | .38 | .27 |

From this data it can be seen that substantially higher CTC blood levels can be obtained from a diet containing a given amount of CTC when sodium sulfate is added to the drinking water of birds consuming such diet.

The results provided also indicate that the addition of sodium sulfate to drinking water containing a given amount of chlortetracycline will produce an increase in antibiotic blood levels of chicks drinking the treated water. Finally, the data clearly demonstrate that increased CTC blood levels are obtained from a given amount of CTC furnished in both the feed and drinking water when sodium sulfate is added to the drinking water.

EXAMPLE IX

The following tests were conducted to determine whether or not the addition of the described sulfate to a medicated poultry drinking water would increase consumption of treated water and thus increase consumption of medicament.

Chicks, five-days old, of similar size and weight were randomly selected for 36 test groups, 12 chicks per group.

These groups were separately caged and starved overnight. The following morning a standard, commercial diet, comprising:

| Diet— | Percent |
|---|---|
| Ground yellow corn | 40.7 |
| Soybean oil meal | 45.5 |
| Menhaden fish meal | 7.5 |
| $CaCO_3$ | 2.4 |
| Dicalcium phosphate | 2.0 |
| Brewers dried yeast | 1.25 |
| Iodized salt | 0.250 |
| Magnesium sulfate | 0.025 |
| Vitamin A (10,000 IU/gm.) | 0.110 |
| Vitamin D–3 (15,000 ICU/gm.) | 0.009 |
| Choline chloride—25% supplement | 0.125 |
| Vitamin supplement 92 | 0.100 |
| Proferm-20 (vitamin $B_{12}$ supplement) | 0.025 |
| Niacin | 0.0044 |
| D-alpha tocopherol acetate | 0.00055 |
| Parvo 3% (folic acid supplement) | 0.0030 | was provided for all groups of chicks. Water containing various medicaments and specified amounts of sodium sulfate was also provided. The groups of birds were weighed at the start of the test period and the average weights calculated and recorded. Weighed amounts of feed were also provided along with measured quantities of water. The chicks were permitted to feed and drink ad libitum for 3 hours. Then they were re-weighed and the amount of feed and drink consumed was determined. Every three hours thereafter for a 24 hour period the above procedure was repeated. At the end of the test period all results were tabulated and the findings appear in Table X below where it is clearly shown that the addition of sodium sulfate to a medicated drinking water produces a substantial increase in the consumption thereof.

EXAMPLE X

Five day-old chicks of similar weight and size were randomly divided into 32 groups of twelve chicks each. These groups were weighed and the average weight of the chicks calculated and recorded. The groups were then placed in separate cages and starved overnight. The following morning weighed amounts of food and measured quantities of water were provided for each group. All groups received the same standard commercial diet set forth in Example IX above. No medication or feed supplement was added to the diet. However, the drinking water supplied to quadruplicate groups of chicks contained various concentrations of sulfates, sweeteners or commercially available electrolytes.

Four control groups were run and they received the standard diet and untreated water. At 3, 6, 12, 21 and 24 hours after feeding was begun, all groups of chicks were weighed. The amounts of feed and water consumed were also determined by weighing and measuring and the average consumption of food and water calculated for each period. From Table XI below, it can here be readily seen that the addition of sodium and potassium sulfate to the drinking water noticeably increased the consumption of water without adversely affecting food consumption. Other additives tested produced little or no change in either water or feed composition.

At sodium sulfate levels of 1.42% in the drinking water, average water consumption increased measureably over that obtainable with 0.71%, but average feed consumption began to taper off. While high levels, i.e., above 1.0% sodium sulfate in the drinking water, are very effective, such levels should be used for short duration. Low levels, i.e., below 1.0% and preferably about between 0.3% and 0.7% are recommended for continuous use.

TABLE X.—CONSUMPTION OF MEDICATED DRINKING WATER

| Time (Hours) | $H_2O$ | CTC.HCl, 2 g./gal. | CTC.HCl, 2 g./gal. plus $Na_2SO_4$, 0.71% | 2-amino-5-nitro-thiazole, 2.36 g./gal. | 2-amino-5-nitro-thiazole, 2.36 g./gal. plus $Na_2SO_4$, 0.71% | Tylosin tartrate, 2 g./gal. | Tylosin, 2 g./gal. plus $Na_2SO_4$, 0.71% | $CTC.SO_4$, 2 g./gal. | $CTC.SO_4$, 2 g./gal. plus $Na_2SO_4$, 0.71% |
|---|---|---|---|---|---|---|---|---|---|
| Average water consumption, Ml./100 Grams Chick | | | | | | | | | |
| 3 | 7.17 | 5.84 | 7.24 | 5.95 | 7.88 | 6.46 | 9.64 | 4.04 | 3.72 |
| 6 | 12.08 | 11.14 | 14.71 | 11.82 | 14.13 | 12.07 | 19.09 | 9.02 | 8.65 |
| 9 | 16.92 | 15.88 | 21.76 | 16.82 | 19.34 | 17.11 | 27.37 | 13.70 | 14.10 |
| 12 | 21.99 | 21.25 | 29.31 | 21.70 | 24.97 | 22.35 | 35.78 | 18.47 | 21.03 |
| 15 | 26.67 | 26.21 | 35.33 | 26.70 | 29.42 | 26.88 | 44.52 | 22.76 | 27.13 |
| 18 | 31.92 | 31.64 | 42.12 | 31.94 | 35.16 | 31.73 | 53.02 | 27.93 | 34.17 |
| 21 | 36.68 | 37.13 | 49.03 | 36.37 | 40.12 | 36.93 | 62.51 | 33.61 | 40.95 |
| 24 | 41.78 | 42.41 | 55.90 | 41.49 | 46.36 | 42.69 | 70.61 | 38.16 | 48.15 |
| Average feed consumption, Gms./100 Grams Chick | | | | | | | | | |
| 3 | 8.29 | 6.92 | 8.12 | 7.13 | 7.19 | 7.50 | 7.28 | 7.33 | 7.43 |
| 6 | 11.03 | 10.09 | 10.78 | 10.00 | 9.65 | 10.86 | 9.87 | 9.81 | 9.97 |
| 9 | 14.12 | 13.30 | 13.87 | 13.10 | 12.38 | 13.83 | 12.67 | 13.03 | 12.51 |
| 12 | 17.48 | 16.54 | 16.93 | 16.69 | 14.92 | 16.98 | 15.97 | 16.23 | 15.80 |
| 15 | 20.96 | 19.24 | 19.96 | 19.50 | 17.66 | 19.77 | 18.93 | 18.90 | 18.33 |
| 18 | 24.51 | 22.36 | 22.96 | 22.98 | 20.17 | 22.83 | 21.63 | 21.75 | 21.20 |
| 21 | 27.75 | 25.40 | 25.48 | 25.48 | 22.59 | 26.07 | 24.49 | 24.87 | 23.97 |
| 24 | 30.79 | 28.30 | 28.44 | 28.30 | 25.32 | 28.97 | 27.39 | 27.40 | 26.71 |
| Average Water To Feed Ratio | | | | | | | | | |
| 3 | 0.81 | 0.85 | 0.90 | 0.84 | 1.08 | 0.86 | 1.35 | 0.54 | 0.50 |
| 6 | 1.10 | 1.11 | 1.39 | 1.20 | 1.46 | 1.11 | 1.94 | 0.91 | 0.86 |
| 9 | 1.21 | 1.20 | 1.59 | 1.30 | 1.56 | 1.24 | 2.17 | 1.06 | 1.13 |
| 12 | 1.26 | 1.28 | 1.76 | 1.31 | 1.67 | 1.32 | 2.24 | 1.14 | 1.34 |
| 15 | 1.27 | 1.36 | 1.80 | 1.39 | 1.67 | 1.36 | 2.36 | 1.21 | 1.48 |
| 18 | 1.30 | 1.41 | 1.86 | 1.40 | 1.75 | 1.39 | 2.47 | 1.29 | 1.62 |
| 21 | 1.33 | 1.46 | 1.94 | 1.44 | 1.78 | 1.42 | 2.57 | 1.36 | 1.71 |
| 24 | 1.36 | 1.50 | 1.98 | 1.48 | 1.84 | 1.47 | 2.59 | 1.40 | 1.80 |

Notes.—CTC.HCl=Chlortetracycline hydrochloride. $CTC.SO_4$=Chlortetracycline bisulfate.

TABLE XI.—DRINKING WATER CONSUMPTION

| Time (Hours) | $H_2O$ | $Na_2SO_4$ 0.355% | $Na_2SO_4$, 0.71% | Sucrose, 0.71% | Cerelose, 0.71% | $K_2SO_4$ 0.71% | Electrolyte, 0.312% KCl., 0.042%, $Ca(OH)_2$ 0.01% $MgSO_4$ |
|---|---|---|---|---|---|---|---|
| | | | Average Water Consumption, Ml. 100 Gm Chick | | | | |
| 3 | 8.67 | 10.91 | 11.97 | 8.70 | 9.23 | 8.72 | 8.65 |
| 6 | 14.43 | 18.67 | 20.75 | 15.08 | 15.00 | 16.04 | 14.21 |
| 12 | 27.14 | 33.33 | 39.28 | 26.69 | 26.87 | 31.02 | 25.96 |
| 21 | 43.39 | 53.72 | 64.62 | 43.40 | 43.95 | 51.26 | 43.53 |
| 24 | 49.88 | 60.79 | 71.96 | 49.20 | 50.33 | 58.65 | 50.18 |
| | | | Average Feed Consumption, Gms. 100 Gm. Chick | | | | |
| 3 | 6.70 | 6.45 | 7.43 | 6.31 | 6.67 | 4.95 | 7.23 |
| 6 | 10.52 | 10.37 | 10.88 | 10.03 | 10.53 | 9.24 | 10.60 |
| 12 | 17.78 | 17.09 | 17.83 | 17.13 | 17.53 | 15.99 | 18.55 |
| 21 | 27.01 | 26.34 | 27.73 | 26.07 | 26.02 | 24.46 | 27.81 |
| 24 | 30.78 | 29.69 | 21.34 | 29.27 | 29.84 | 28.00 | 31.50 |
| | | | Average Water To Feed Ratio | | | | |
| 3 | 1.32 | 1.70 | 1.61 | 1.38 | 1.44 | 1.76 | 1.20 |
| 6 | 1.39 | 1.80 | 1.94 | 1.50 | 1.46 | 1.74 | 1.37 |
| 12 | 1.53 | 1.95 | 2.23 | 1.56 | 1.56 | 1.95 | 1.41 |
| 21 | 1.61 | 2.04 | 2.34 | 1.67 | 1.71 | 2.10 | 1.57 |
| 24 | 1.62 | 2.05 | 2.31 | 1.69 | 1.71 | 2.10 | 1.59 |

EXAMPLE XI

Potentiation of chlortetracycline blood levels in chicks fed a corn diet containing 200 p.p.m. of CTC·HCl and 0.8% calcium ion from calcium carbonate is achieved with the addition of sulfuric acid and ammonium sulfate. Groups of chicks were starved overnight then permitted to feed and drink ad libitum for three hours. At the end of the three hour period, the chicks were bled by cardiac puncture and the CTC blood levels assayed microbiologically. Chicks receiving the control diet containing 220 p.p.m. of CTC, but no added sulfate ion, were found to have 0.11 γ/ml. of CTC in the blood. Those receiving 1.03% dietary sulfate ion furnished from sulfuric acid had CTC blood levels of 0.26 γ/ml. Those receiving the same level of sulfate ion from ammonium sulfate had CTC blood levels of 0.21 γ/ml.

I claim:

1. A medicated poultry drinking water composition comprising water and a medicament selected from the group consisting of tetracycline, chlortetracycline, oxytetracycline, and demethylchlortetracycline, and a sulfate of a cation carrying a single positive charge in an amount sufficient to provide from about 0.1 to about 1.0 percent by weight of sulfate ion in the water.

2. A composition according to claim 1 in which the medicament is chlortetracycline.

3. A method for controlling infectious diseases in poultry which comprises feeding poultry a medicated drinking water composition to increase the ingestion thereof by the poultry, which composition comprises water and a medicament selected from the group consisting of tetracycline, chlortetracycline, oxytetracycline, and demethylchlortetracycline, and a sulfate of a cation carrying a single positive charge in an amount sufficient to provide from about 0.1 to about 1.0 percent by weight of sulfate ion in the water.

4. A method according to claim 3 in which the medicament is chlortetracycline.

References Cited

UNITED STATES PATENTS 3,121,634  2/1964  Kichline _____ 99—4
3,157,512  11/1964  Muller _____ 99—2

OTHER REFERENCES

Pensack et al.: "Laboratory Evaluation of Method for Potentiating Antibiotics," in The Potentiation of Aureomycin in Feed, Oct. 19, 1959, a booklet, pp. 2, 33–34 and 44–47.

Nelson et al.: Journal of the Poultry Science Assn., Poultry Science, September 1961, vol. 40, No. 5, p. 1436.

STANLEY J. FRIEDMAN, Primary Examiner

U.S. Cl. X.R.
99—2; 424—227